US012168362B2

(12) United States Patent
Chen et al.

(10) Patent No.: US 12,168,362 B2
(45) Date of Patent: Dec. 17, 2024

(54) GREETING CARD ASSEMBLY WITH SIMULATED BACKGROUND FIREWORKS

(71) Applicants: JAST Gifts Shenzhen Company Limited, Shenzhen (CN); 100 Greetings, LLC, Clearwater, FL (US)

(72) Inventors: Jen-Lin Chen, Cupertino, CA (US); Jay Kamhi, Belleair, FL (US)

(73) Assignees: JAST Gifts Shenzhen Company Limited, Shenzhen (CN); 100 Greetings, LLC, Clearwater, FL (US)

( * ) Notice: Subject to any disclaimer, the term of this patent is extended or adjusted under 35 U.S.C. 154(b) by 0 days.

(21) Appl. No.: 18/737,235

(22) Filed: Jun. 7, 2024

(65) Prior Publication Data

US 2024/0326506 A1 Oct. 3, 2024

Related U.S. Application Data

(63) Continuation-in-part of application No. 17/839,563, filed on Jun. 14, 2022, now abandoned.

(51) Int. Cl.

| | |
|---|---|
| ***G09F 1/00*** | (2006.01) |
| ***B42D 15/02*** | (2006.01) |
| ***B42D 15/04*** | (2006.01) |
| ***G09F 1/04*** | (2006.01) |

(52) U.S. Cl.

CPC ......... *B42D 15/022* (2013.01); *B42D 15/045* (2013.01)

(58) Field of Classification Search

CPC .. B42D 15/042; B42D 15/022; B42D 15/045; G09F 1/06; G09F 1/08; G09F 1/00; G09F 1/04; G09F 13/005

See application file for complete search history.

(56) References Cited

U.S. PATENT DOCUMENTS

| | | | |
|---|---|---|---|
| 5,317,823 A | | 6/1994 | Brunt, II |
| 5,588,233 A | | 12/1996 | Volkert et al. |
| 5,864,973 A | | 2/1999 | Cole |
| 5,905,429 A | * | 5/1999 | Hornstein ............... G09F 25/00 340/384.6 |
| 8,661,719 B2 | * | 3/2014 | Hughes ................ B42D 15/022 40/124.02 |
| 9,469,146 B2 | | 10/2016 | Bogdanski et al. |
| 9,836,997 B1 | | 12/2017 | Brandrup |

(Continued)

*Primary Examiner* — Shin H Kim

(74) *Attorney, Agent, or Firm* — LaMorte & Associates P.C.

(57) ABSTRACT

A greeting card that selectively opens and closes. The greeting card assembly simulates a firework display in the background of a foreground message when opened. The greeting card assembly has a card section that contains an internal compartment covered by a top panel. A plurality of cutouts are formed through the top panel that are shaped as firework starbursts. LEDs are positioned within the internal compartment for selectively backlighting the cutouts. A light diffusing element is interposed between the cutouts and the LEDs. A speaker is positioned within the internal compartment for playing a digital soundtrack of exploding fireworks. At least one foreground panel is provided that is positioned a distance from the top panel when the greeting card assembly is opened. When viewed, the foreground panels stand in front of a card section that is playing a soundtrack and flashing lights behind starburst cutouts to simulate background fireworks.

17 Claims, 6 Drawing Sheets

(56) References Cited

U.S. PATENT DOCUMENTS

| | | | |
|---|---|---|---|
| 9,842,516 | B2 | 12/2017 | Yeh |
| 10,500,887 | B1 | 12/2019 | Kelly |
| 2010/0097448 | A1 | 4/2010 | Gilbert et al. |
| 2011/0167685 | A1 | 7/2011 | Taylor et al. |
| 2011/0258892 | A1 | 10/2011 | Taylor et al. |
| 2013/0139419 | A1 | 6/2013 | Guo et al. |
| 2013/0255115 | A1 | 10/2013 | Hughes et al. |
| 2015/0135566 | A1 | 5/2015 | Simmons |
| 2017/0267012 | A1 | 9/2017 | Krieman |
| 2019/0329145 | A1 | 10/2019 | Simmons et al. |
| 2023/0053542 | A1 | 2/2023 | Chen |

* cited by examiner

GREETING CARD ASSEMBLY WITH SIMULATED BACKGROUND FIREWORKS

RELATED APPLICATIONS

This application is a continuation-in-part of U.S. patent application Ser. No. 17/839,563, filed Jun. 14, 2022.

BACKGROUND OF THE INVENTION

1. Field of the Invention

In general, the present invention relates to greeting cards that contain various electronic features that enable the greeting card to activate lights and generate sound when opened.

2. Prior Art Description

Greeting cards have been made and sold for centuries. In modern times, a greeting card is typically made from a folded piece of thick paper stock. This requires that the card be unfolded or "opened" in order to read the message printed on the card.

Many greeting cards have panels and various folded constructs that are glued to the stock paper substrate of the card. This creates layers of paper on either side of the fold line. Since a greeting card can have a layered construction, it is possible for electronic components, such as circuit boards and batteries, to be integrated into the layered structure of the greeting card. The electronic components provide the greeting card with the ability to play music or flash lights when the greeting card is opened. Such prior art greeting cards are exemplified by U.S. Pat. No. 11,577,539 to Chen and U.S. Patent Application Publication No. 2023/0166553 to Chen.

Greeting cards that contain electronics typically contain an on/off switch that automatically activates the electronics when the greeting card is opened. In this manner, the greeting card will only play music and/or flash lights when the greeting card is opened. The on/off switch prevents the electronics from being inadvertently activated when the greeting card is closed and is compressed in an envelope.

Although prior art greeting cards contain lights and play sounds, the lights illuminate the foreground of the graphics and/or graphics in the same plane as the primary graphics. The lights are not used to create background imagery. In cinema and photography, one of the most iconic backgrounds used in scenes of celebration is that of a fireworks display. Such imagery has great commercial appeal for a variety of products, such as celebratory greeting cards. However, it is very difficult to produce the imagery of a background fireworks display in a medium such as a greeting card.

The present invention is a novelty greeting card design that is capable of providing a pop-up message in a foreground and produces a simulation of a fireworks display in the background. In this manner, the card simulates the iconic celebratory imagery of a background fireworks display. The details of the novel greeting card design are described and claimed below.

SUMMARY OF THE INVENTION

The present invention is a greeting card assembly that can be selectively opened and closed. The greeting card assembly simulates a fireworks display in the background and a celebratory message in the foreground when opened. The greeting card assembly has a card section that contains an internal compartment. The internal compartment is covered by a top panel. A plurality of cutouts are formed through the top panel, wherein the plurality of cutouts are shaped as firework starbursts. LEDs are positioned within the internal compartment for selectively backlighting the cutouts from within said internal compartment. A light diffusing element is interposed between the cutouts and the LEDs within the internal compartment for diffusing light produced by the LEDs.

A speaker is positioned within the internal compartment for playing a digital soundtrack of exploding fireworks. The LEDs activate in synchrony with the digital soundtrack so that the LEDs light when sounds of exploding and crackling fireworks are produced.

At least one foreground panel is provided that is positioned a distance from the top panel when the greeting card assembly is opened. The foreground panel contains the foreground message. When viewed, the foreground panel stands in front of a card section that is playing a soundtrack and flashing lights behind starburst cutouts to simulate background fireworks.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention greeting card assembly can be embodied in many ways, only one exemplary embodiment is illustrated. The exemplary embodiment is shown for the purposes of explanation and description. The exemplary embodiment is selected in order to set forth one of the best modes contemplated for the invention. The illustrated embodiment, however, is merely exemplary and should not be considered limiting when interpreting the scope of the claims.

Figure 1:
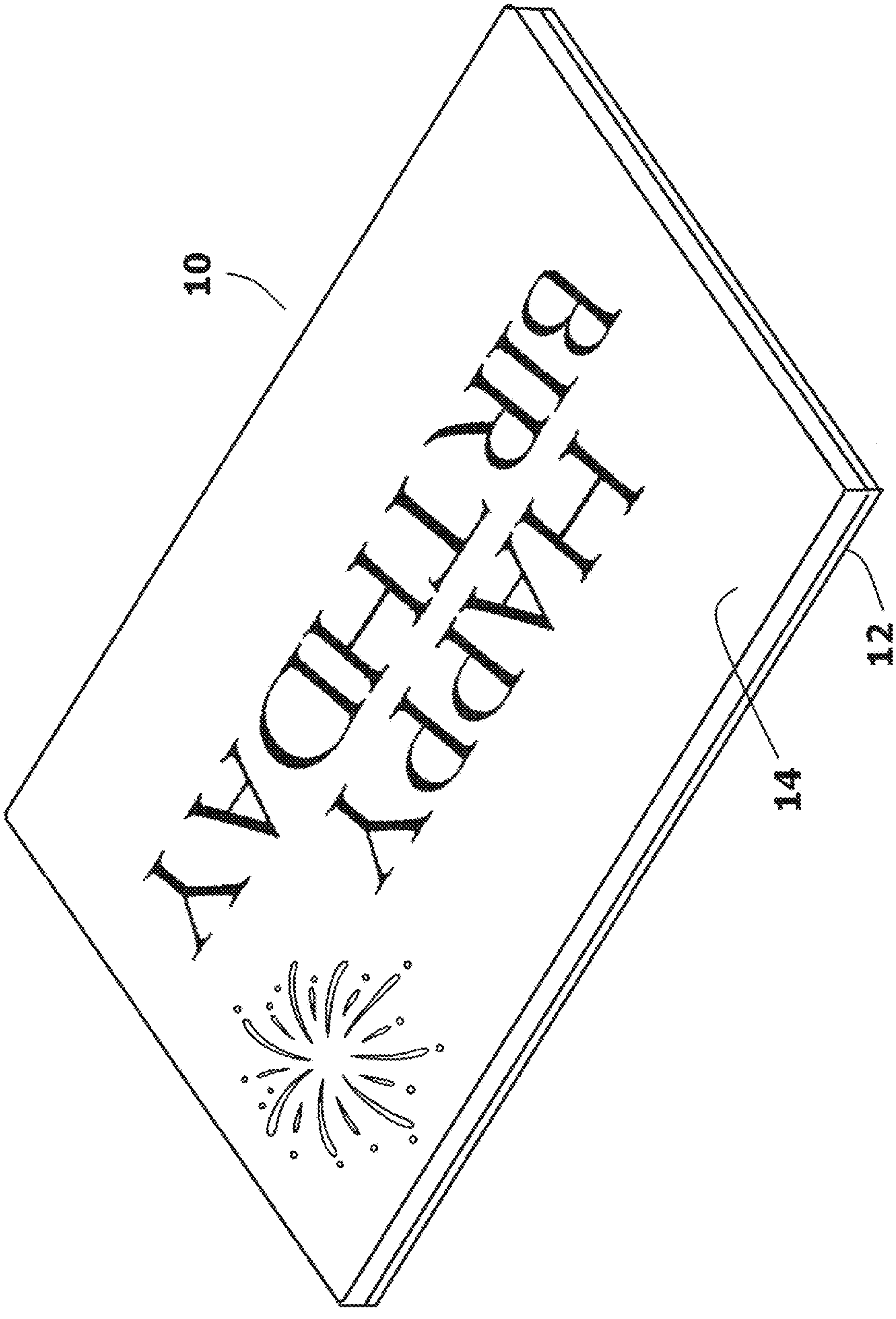
FIG. 1 shows an exemplary embodiment of a greeting card assembly in a closed configuration.
Figure 2:
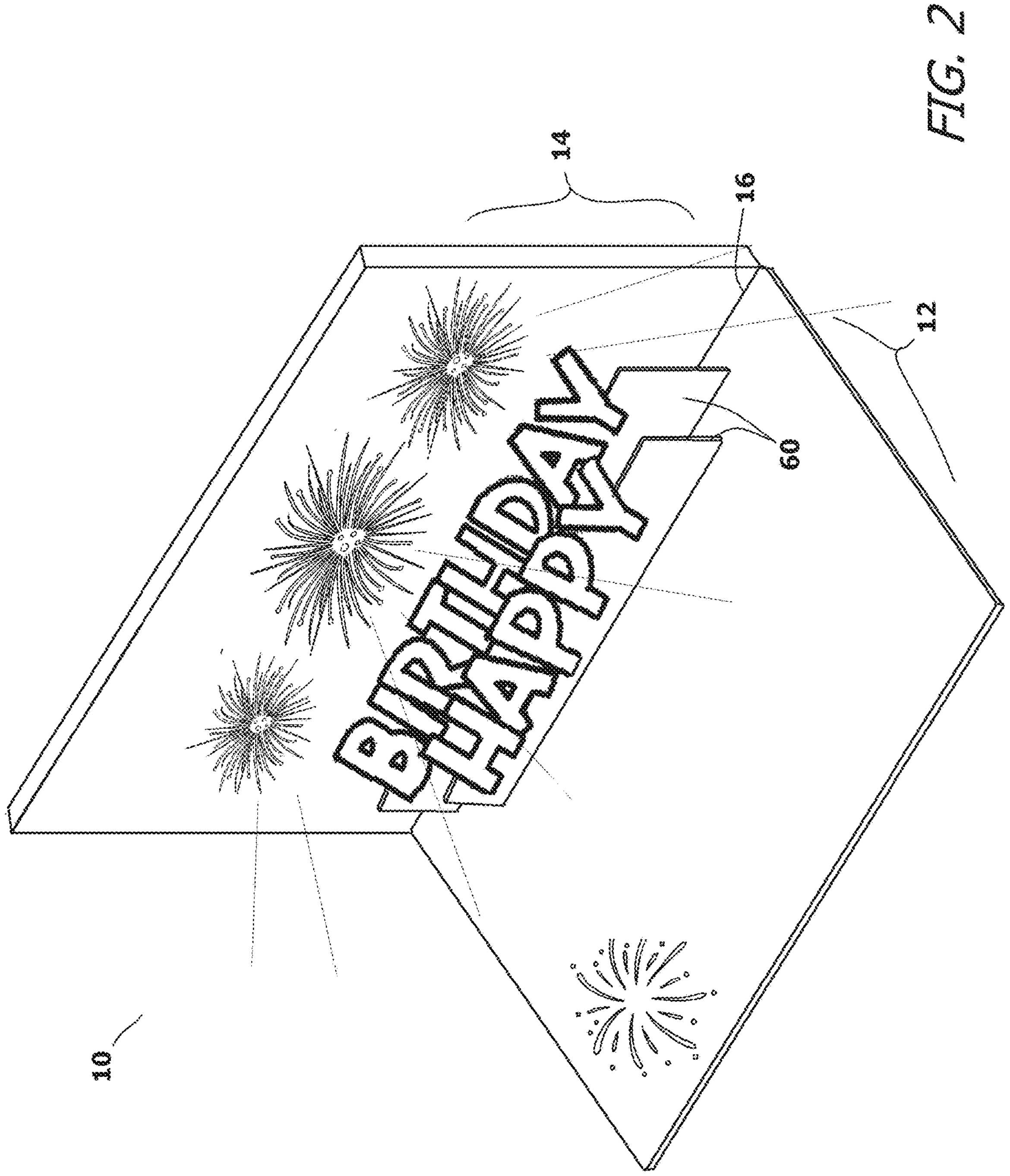
FIG. 2 shows the first exemplary embodiment of a greeting card assembly in an open configuration.
Figure 3:
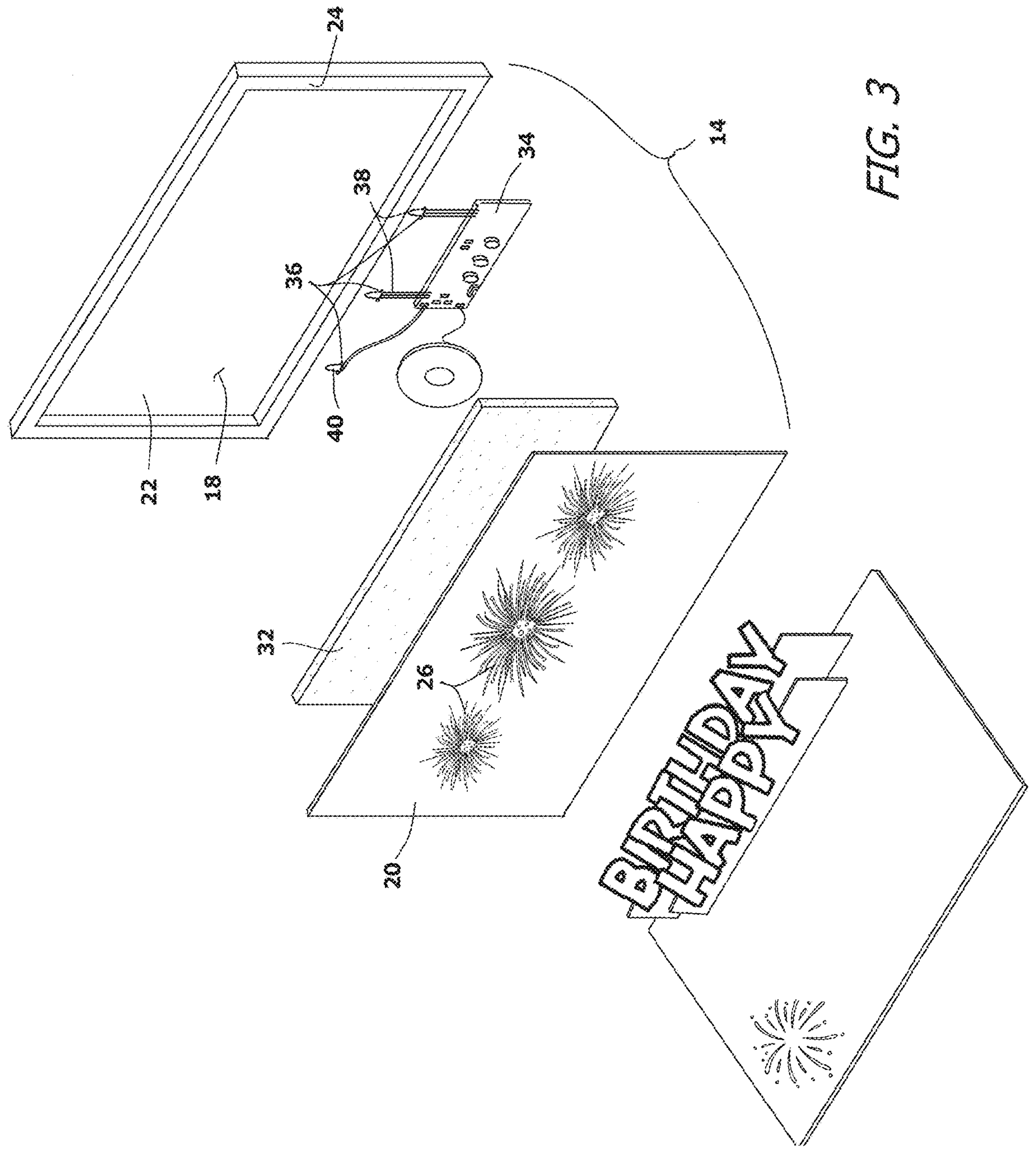
FIG. 3 shows an exploded view of the exemplary embodiment of FIG. 2.

Referring to FIG. 1 in conjunction with FIG. 2 and FIG. 3, a greeting card assembly 10 is shown. The greeting card assembly 10 has two sections 12, 14 that are joined along a central fold seam 16. The first section 12 folds over the second section 14, therein forming the principal shape of a greeting card. When the first section 12 folds over the second section 14, the greeting card assembly 10 is considered closed. Conversely, when the first section 12 is rotated away from the second section 14 to a configuration where the first section 12 and the second section 14 are near or beyond perpendicular, then the greeting card assembly 10 is considered open.

Figure 4:
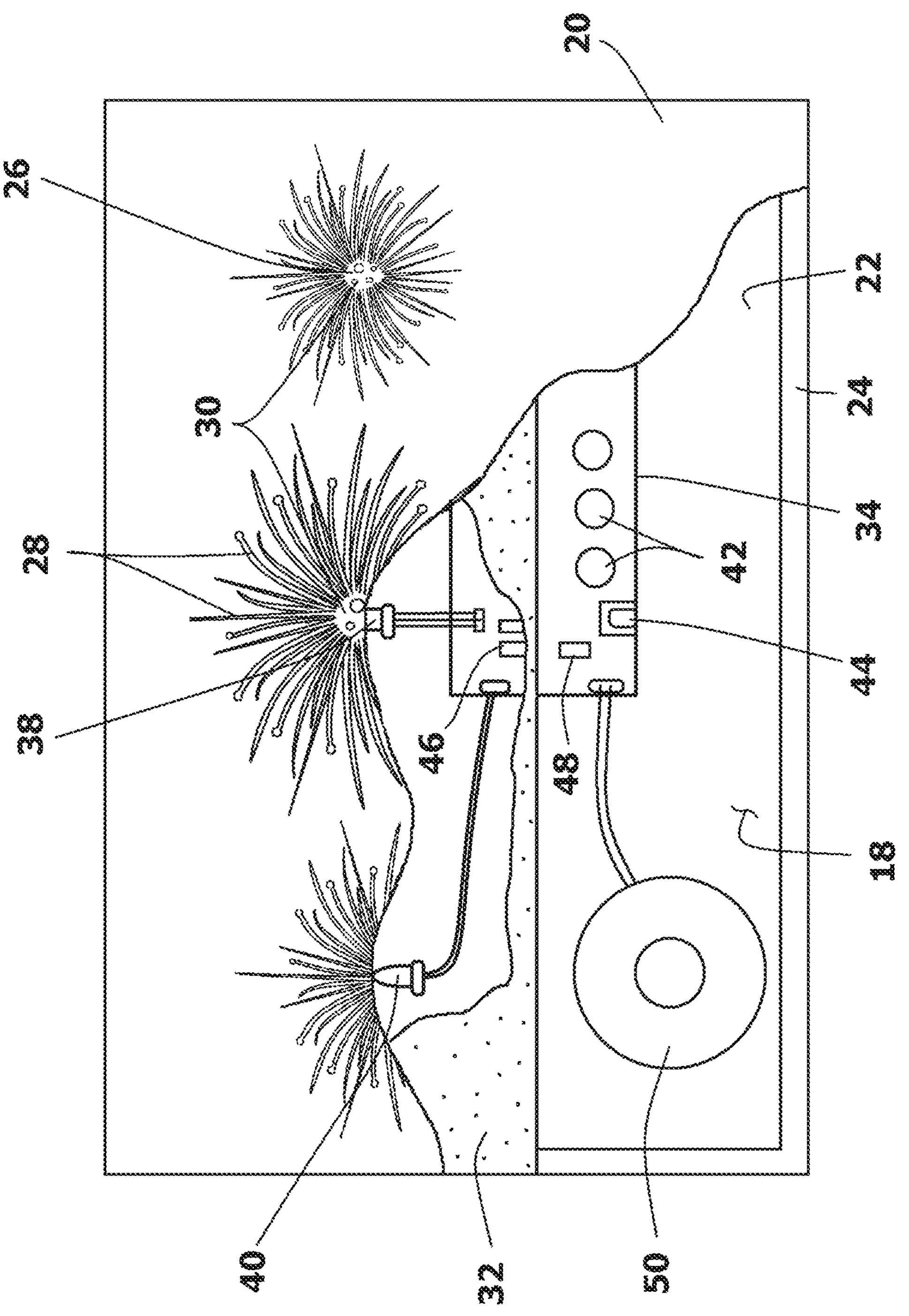
FIG. 4 is a partially fragmented front view of the second card section; shows an image of the digital soundtrack used to reproduce the sounds of a firework display and shows LED activation events.

Referring to FIG. 3 in conjunction with FIG. 4, it can be seen that the second section 14 contains an internal compartment 18. The internal compartment 18 is defined between a top panel 20, a bottom panel 22, and optional with peripheral walls 24. The peripheral wall 24 can be added or can be made using folds in the top panel 20 and/or bottom panel 22 to form an internal compartment 18. The use of a peripheral wall 24 is preferred. However, if no peripheral wall 24 is used, the internal compartment 18 can be formed as an envelope compartment by attaching the periphery of the top panel 20 to the periphery of the bottom panel. When the greeting card assembly 10 is in its closed configuration, the top panel 20 of the second section 14 faces the first section 12. The top panel 20 is made from an opaque piece of paper into which multiple patterns 26 of firework starbursts have been cut away. Each firework starburst pattern 26 includes a multitude of straight and curved slots 28 that radiate from a common central region 30. The slots 28 are cut through the top panel 20 to enable the slots 28 to be backlit from within the internal compartment 18. The visible side of the top panel 20 is preferably a dark color, such as black, or navy blue to present the appearance of a night sky and to contrast the backlighting of the firework starburst patterns 26.

A translucent light diffusing material 32 is provided within the internal compartment 18. The light diffusing material 32 is preferably white in color. A preferred light diffusing material 32 is a thin sheet of polystyrene. The light diffusing material 32 is placed against the interior of the top panel 20 over the slots 28 forming the firework starburst patterns 26. In this manner, a person looking at the firework starburst patterns 26 will see the white light diffusing material 32 through the slots 28 set against the dark color of the top panel 20.

An electronics module 34 is mounted inside the internal compartment 18 of the second section 14. The electronics module 34 contains an LED 36 for each of the firework starburst patterns 26 cut through the top panel 20. Each LED 36 is positioned adjacent to the center region 30 of a firework starburst pattern 26, wherein the light diffusing material 32 is interposed between each LED 36 and each starburst pattern 26. At least some of the LEDs 36 are multi-color LEDS 38 that are sometimes referred to as RGB LEDs. The multi-color LEDs 38 are capable of being illuminated in various colors and color combinations when activated. Depending upon the number of firework starburst patterns 26 being used, the multi-colored LEDs 38 can be mixed with one or more single color LEDs 40.

The electronics module 34 also contains batteries 42, an activation switch 44, circuitry 46 to selectively drive the LEDs 36 and memory 48 sufficient to hold a 5 to 15 second digital soundtrack of exploding fireworks. A speaker 50 is provided to play the digital soundtrack. The light diffusing material 32 placed over the firework starburst patterns 26 do not cover the speaker 50 so as not to muffle the sounds produced by the speaker 50.

Figure 5:
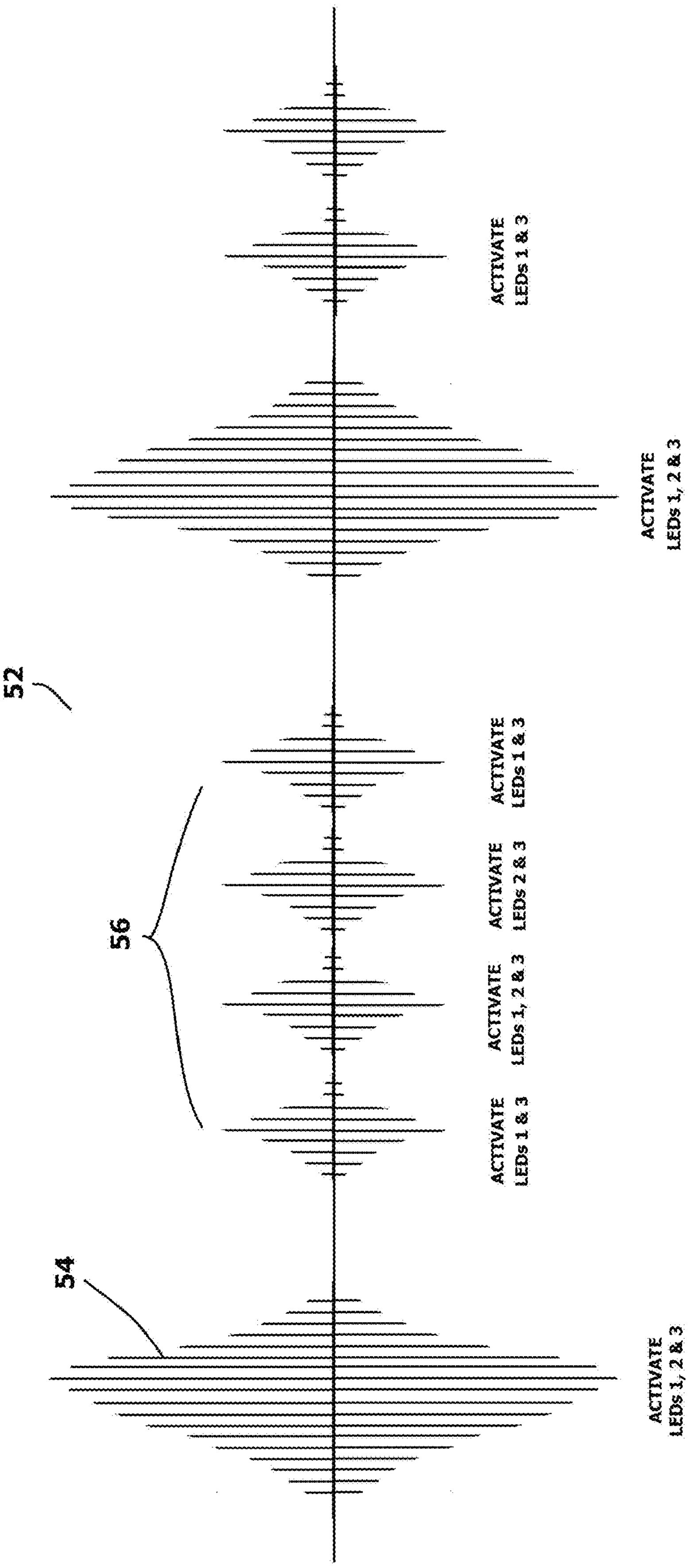
FIG. 5 shows an image of the digital soundtrack used to reproduce the sounds of a firework display and shows LED activation events.

Referring to FIG. 5 in conjunction with FIG. 4, it can be seen that the digital soundtrack 52 includes periodic large sound signals 54 of exploding fireworks dispersed among rapid small sound signals 56 of firework crackles. Thus, the digital soundtrack 52 produces the sound of firework mortars/rockets exploding in the air and crackling as they ignite, spread into a starburst, and then burn out. The electronics module 34 coordinates the activation of the LEDs 36 with the digital soundtrack 52. Each time the digital soundtrack 52 produces a large sound signal 54 and one or more of the LEDs 36 is activated for up to one second. If the LED 36 is a multi-color LED 38, the multi-color LED 38 is activated in a first color. For each subsequent large sound signal 54 in the digital soundtrack 52, the multi-colored LEDs 38 activate in a different color. As such, it will be understood that each time the digital soundtrack 52 plays an exploding firework, one of more LEDs 36 illuminate to accompany the sound with light. In the digital soundtrack 52, after each large sound signal 54 of a firework explosion, there is a delayed small sound signals 56 of the firework crackling and burning out. During these small sound signals 56, one or more of the LEDs 36 rapidly flash to accompany the secondary small sound signals 56 with light.

The electronics module 34 has an activation switch 44 that is triggered when the greeting card assembly 10 is altered from its closed configuration to its open configuration. Upon the opening of the greeting card assembly 10, the digital soundtrack 52 plays and the LEDS 36 light up in synchrony with the playing of the digital sound track 52. The digital soundtrack 52 is heard by the person who opens the greeting card assembly 10. The lights produced by the LEDs 36 is only visible through the cutout firework starburst patterns 26 and the light diffusing material 32 positioned between the cutout firework starburst patterns 26 and the LEDs 36. The result is that the firework starburst patterns 26 illuminate on the second section 14 of the greeting card assembly 10 through the dark color of the top panel 20. This flashes the firework starburst patterns 26 and makes the firework starburst patterns 26 highly visible. The backlight illumination of the firework starburst patterns 26 is synchronized with the digital soundtrack 52 and creates the sight and sound of fireworks exploding when the greeting card assembly 10 is opened.

Figure 6:
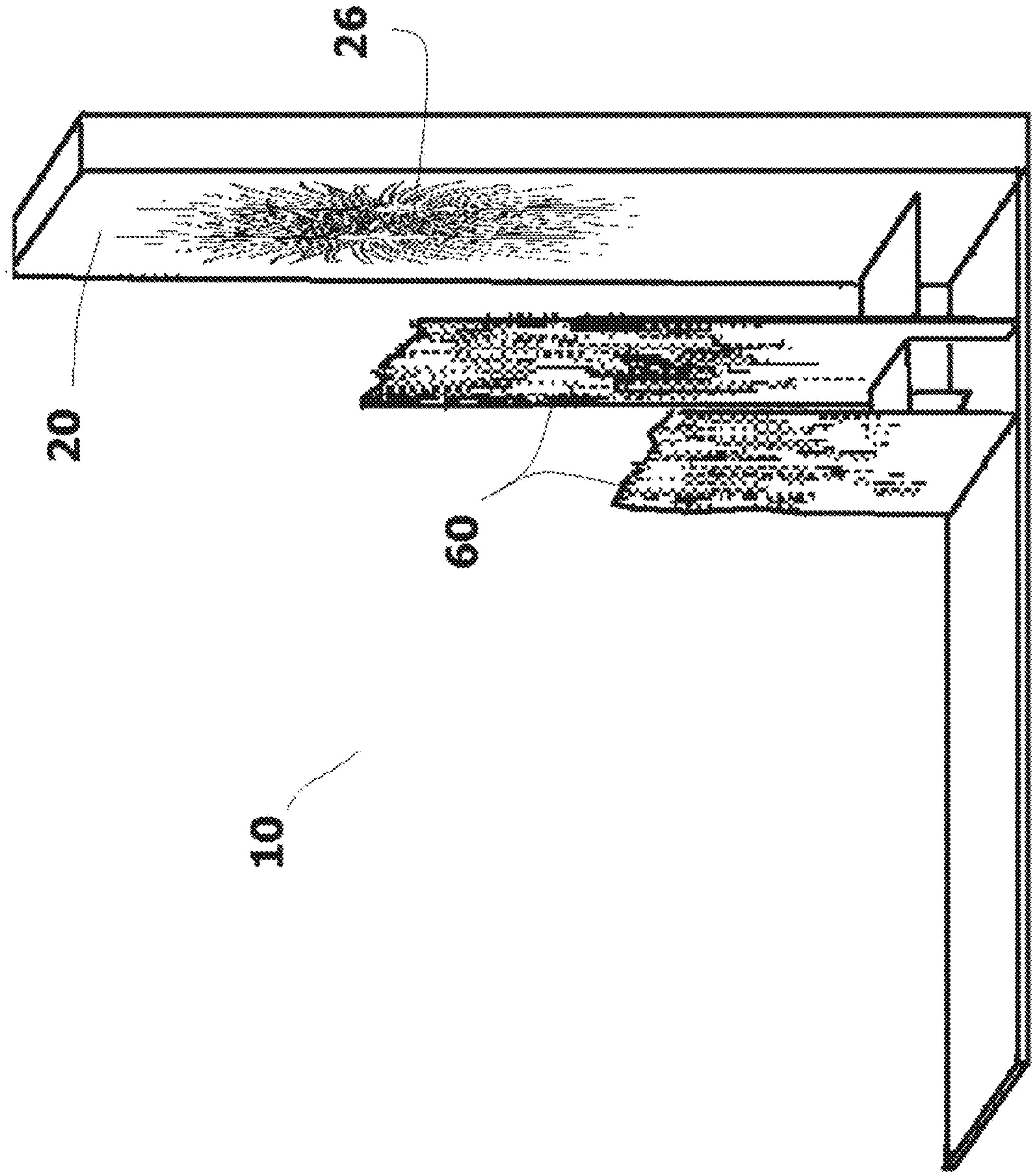
FIG. 6 shows the positioning of foreground panels in front of the second card section.

Returning to FIG. 3 and FIG. 2, it can be seen that the first section 12 of the greeting card assembly 10 covers the top panel 20 of the second section 14 when the greeting card assembly 10 is closed. One or more foreground panels 60 can be provided that link to both the first section 12 and the second section 14 of the greeting card assembly 10. When the greeting card assembly 10 is closed, the foreground panels 60 lay flat between the first section 12 and the second section 14. Referring to FIG. 6, it can be seen that when the greeting card assembly 10 is open, the foreground panels 60 stand up. The foreground panels 60 can contain words, or graphics, such as “Happy Birthday” or “Congratulations”. The foreground panels 60 stand before the top panel 20 of the second section 14. As such, the top panel 20 with the firework starburst patterns 26 serve as the background to the foreground panels 60. The overall result is that the background of the foreground panels 60 appears to be filled with exploding fireworks as the sounds and lights are activated.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A greeting card assembly that can be selectively opened and closed, wherein said greeting card assembly simulates a fireworks display in the background of a foreground message when opened, said assembly comprising:

a card section that contains an internal compartment that is covered by a top panel;

a plurality of cutouts formed through said top panel, wherein said plurality of cutouts are shaped as firework starbursts;

LEDs positioned in said internal compartment for selectively backlighting said plurality of cutouts from within said internal compartment;

a light diffusing element interposed between said cutouts and said LEDs within said internal compartment for diffusing light produced by said LEDS;

a speaker positioned in said internal compartment for playing a digital soundtrack, wherein said LEDs activate in synchrony with said digital soundtrack; and at least one foreground panel positioned a distance from said top panel of said card section when said greeting card assembly is opened, wherein said at least one foreground panel contains said foreground message.

2. The assembly according to claim 1, wherein said digital soundtrack is a soundtrack of exploding fireworks that contains sounds of fireworks exploding and fireworks crackling after exploding.

3. The assembly according to claim 1, wherein at least one of said LEDs activates at each occurrence of a firework exploding contained in said digital soundtrack.

4. The assembly according to claim 1, wherein at least some of said LEDs rapidly flash during each occurrence of a firework crackling contained in said digital soundtrack.

5. The assembly according to claim 1, further including a card cover that is connected to said card section at a fold seam, wherein said card cover folds over said card section when said greeting card assembly is closed.

6. The assembly according to claim 1, wherein said digital soundtrack and at least some of said LEDs automatically activate when said greeting card assembly is opened.

7. The assembly according to claim 1, wherein said cutouts contain a plurality of straight slots and a plurality of curved slots emanating from a common central region, therein forming said firework starbursts.

8. The assembly according to claim 1, wherein said light diffusing element is a panel of white polystyrene.

9. The assembly according to claim 1, wherein said LEDs include multi-color LEDs that illuminate in different colors during the playing of said digital soundtrack.

10. A greeting card assembly, comprising:

a first card section and a second card section joined at a fold, wherein said first card section can be selectively moved over said second card section to form a closed configuration and away from said second card section in an open configuration;

wherein said second card section contains an internal compartment that is covered by a top panel;

a plurality of cutouts formed in said top panel;

LEDs positioned in said internal compartment for selectively backlighting said cutouts;

a light diffusing element interposed between said plurality of cutouts and said LEDs for diffusing light produced by said LEDs; and a speaker positioned in said internal compartment for playing a digital soundtrack, wherein said LEDs activate in synchrony with said digital soundtrack.

11. The assembly according to claim 10, wherein each of said plurality of cutouts has multiple straight slots and curved slots that emanate from a common central region, therein forming the shape of a firework starburst.

12. The assembly according to claim 10, wherein said digital soundtrack is that of exploding fireworks that contain sounds of fireworks exploding and fireworks crackling after exploding.

13. The assembly according to claim 12, wherein at least one of said LEDs is activated for each occurrence of a firework exploding contained in said digital soundtrack.

14. The assembly according to claim 13, wherein at least one of said LEDs rapidly flash during each occurrence of a firework crackling contained in said digital soundtrack.

15. The assembly according to claim 14, further including at least one foreground panel positioned a distance from said second card section when said greeting card assembly is in said open configuration, wherein said at least one foreground panel contains a foreground message.

16. The assembly according to claim 10, wherein said light diffusing element is a panel of white polystyrene.

17. The assembly according to claim 10, wherein said LEDs include multi-color LEDs that illuminate in different colors during the playing of said digital soundtrack.

* * * * *